Nov. 17, 1931.   G. B. SHERMAN ET AL   1,832,429
SELF SHARPENING PLOW SHARE
Filed Nov. 11, 1926

Inventor:
George B. Sherman,
Robert H. Potts,
By Chindahl Parker Karlson
Attys.

Patented Nov. 17, 1931

1,832,429

UNITED STATES PATENT OFFICE

GEORGE BENJAMIN SHERMAN AND ROBERT HENRY POTTS, OF EVANSVILLE, INDIANA, ASSIGNORS, BY DIRECT AND MESNE ASSIGNMENTS, TO SHERMAN BROS. DEVELOPMENT CORPORATION, OF EVANSVILLE, INDIANA, A CORPORATION OF INDIANA

SELF-SHARPENING PLOW SHARE

Application filed November 11, 1926. Serial No. 147,705.

The present invention relates to a novel self-sharpening plow share, comprised of two or more layers of steels having different carbon contents.

One of the greatest objections to present day plow shares is that they must be resharpened frequently, thereby involving loss of time, trouble, and expense, and shortening the life of the share. This applies particularly to tractor plow shares when used in hard ground in the fall of the year, since under these conditions the shares must be resharpened almost every day.

The primary object of the present invention, therefore, resides in the provision of a novel plow share which can be left on the plow without being resharpened until it wears out, or at least until it has given considerable service.

A more specific object of the invention is to provide a novel plow share which will be self-sharpened by use.

Still another object is to provide a new and improved self-sharpening plow share which is inexpensive in construction, and easy to manufacture, which is strong and tough, and in which the surface subjected to the severest wearing action is hard and smooth and therefore not likely to collect pasty soil or to be roughened by the scouring action of the soil.

We accomplish the above objects by providing a plow share consisting of two layers of steel, one of which has a high carbon content and is heat treated to provide hardness, and the other of which has a low carbon content, and has therefore a relatively high ductility. The hard steel layer preferably is made the upper layer of the share where most of the scouring action of the soil will occur. The soft steel layer, being tough and ductile, backs up and reenforces the more brittle hard layer so as to protect the latter against breaking or cracking when striking hard objects in the soil or when used under severe conditions. This soft layer, being adapted to wear more readily than the hard steel layer, will, as wear occurs, always recede a short distance from the relatively sharp edge of the latter, thereby providing the plow share at all times with a sharp cutting edge regardless of wear.

Further objects and advantages will become apparent as the description proceeds.

Figure 1:
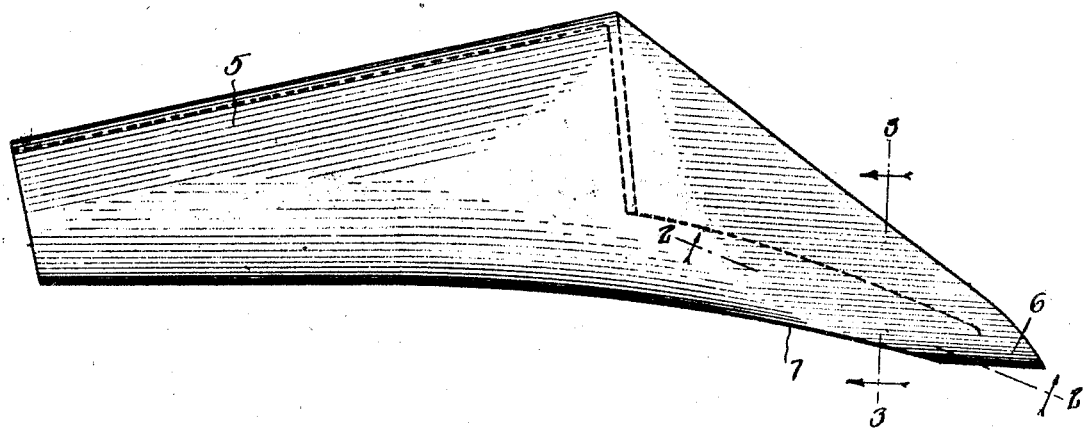

In the accompanying drawings:

Figure 1 illustrates a plow share of standard design which is constructed in accordance with our invention.

Figure 2:
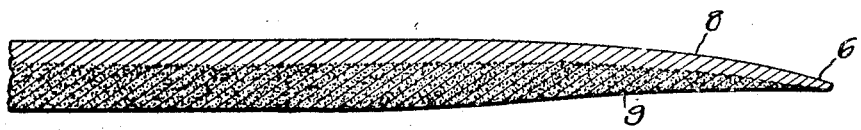
Figure 3:
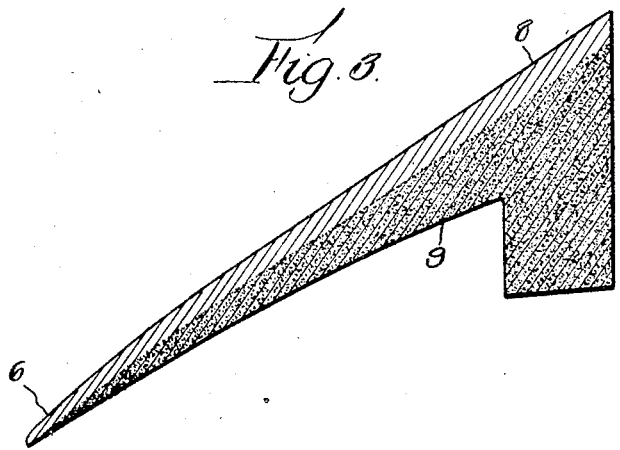

Figs. 2 and 3 are respectively fragmentary sections taken along lines 2—2 and 3—3 of Fig. 1, and showing diagrammatically the thicknesses of the two steel layers of different carbon contents.

While our invention is susceptible of various modifications and alternative constructions, we have shown in the drawings and will herein describe in detail the preferred embodiment, but it is to be understood that we do not thereby intend to limit the invention to the specific form disclosed, but intend to cover all modifications and alternative constructions falling within the spirit and scope of the invention as expressed in the appended claims.

Referring more specifically to the drawings, a steel plow share of standard design is designated generally at 5, and comprises a point 6 having a cutting edge 7, said cutting edge running along one side of the share. The share comprises an upper layer 8 and a lower layer 9, one layer having a high carbon content and being hardened, and the other layer having a relatively low carbon content and being unhardened. Since most of the wearing action normally occurs against the top of the plow share, it is preferable to make the upper layer 8 with the high carbon content and the lower layer 9 with the low carbon content. It is also preferable that the high carbon steel have from .80% to 1.00% carbon, and that the low carbon steel have less than .25% carbon.

In making the plow share, the single ply of two layer steel may be obtained by either of two processes, namely: the rolling process or the carbonizing process. In the rolling process, two separate plies of steel having the desired carbon contents and the desired relative thicknesses are rolled together under heat and pressure to form a single ply. The resulting two layer ply is now annealed and cooled slowly to normalize the crystalline structure which was worked and hence distorted in the rolling.

In the carbonizing process, a single ply of steel having a uniform carbon content corresponding to the desired low carbon content of the layer 9 is provided. This ply is subjected on one side or surface only to a carbonizing action to obtain the desired high carbon content of layer 8 to the desired depth. The demarcation between the layers preferably should be abrupt so that each layer is of sufficient thickness to accomplish its purpose. The carbonizing process is old and well known in the case-hardening of metal parts, and it is therefore deemed unnecessary to describe the same herein. It is sufficient to say that the carbon content and the depth of the high carbon layer can be controlled by varying the conditions under which the process is carried on.

The two-layer ply of steel, whether formed by the rolling process or by the carbonizing process, is now formed into the desired shape of the plow share. Since the specific means by which, and manner in which, this is accomplished are old and well known in the art, and form no part of the present invention, they will not be described herein.

The plow share is now heat treated in a manner to harden the high carbon layer 8 but to retain the low carbon layer 9 in a ductile and unhardened condition. When steel is heated through its critical range, the pre-existing crystalline structure, however coarse, is destroyed and a refined structure is obtained. The structure, which is finest as it emerges from the range, will grow on further heating and will continue to coarsen as it cools slowly to the critical range. The refined structure is hard and tough. No material refining of the structure, and hence no hardening will take place if the temperature of the steel remains below its critical point. In carrying out the heat treatment, the plow share is heated to a temperature at or slightly above the critical range of the high carbon layer, but not through the critical range of the low carbon layer. This is possible since in divergent carbon contents in hypo-eutectoid steels, the upper temperatures of the critical ranges of said steels differ considerably. Thus, the approximate upper critical temperatures for 0.85%, 0.40% and 0.20% carbon steels are respectively 715° C., 770° C. and 830° C. Theoretically, to obtain the maximum hardness and toughness, the steel should be heated just through the critical range, and no higher. In industrial practice, however, the plow share is heated to a temperature slightly above the critical range so that the interior of the metal, which lags in temperature when the share is heated rapidly, will pass through the range, and so that there will be time enough to handle the share before the temperature drops through the range on cooling. Preferably, the plow share is heated up to a temperature approximately between 760° C. and 825° C., the maximum temperature depending upon the percentage of carbon in the low carbon layer 9. By heating the high carbon layer 8 above its critical temperature, its old crystalline structure is destroyed and refined, thereby hardening the layer. Since the low carbon layer 9 is not heated above its critical range, it is not hardened appreciably. Furthermore, low carbon steel, since it has more free ferrite than has high carbon steel, is softer and more ductile than the latter even when heated through the critical range. Hence, if the layer 9 has a very low carbon content, it can even be heated above its critical range without hardening too much for the present purpose. As a result of the heat treatment, the layer 8 will be hard and will not wear readily, and the layer 9 will be tough to prevent breakage in use, and will wear to leave the sharp edge of layer 8 exposed.

To retain the fine hard structure of the high carbon layer 8, the plow share is quenched, thereby denying time for the structure to coarsen and soften, as it would if allowed to cool slowly to atmospheric temperature. Preferably the quenching or annealing bath consists of brine at or below a temperature of 10° C.

In quenching the plow share, there will be a tendency to warp, due to the excessive and uneven shrinkage of the high carbon layer 8 in cooling through its critical range, and further due to the difference in the coefficients of shrinkage of the two layers. Uniform warpage can be controlled by making allowance therefore. Heretofore it has been found impossible to make two layer steel plow shares without excessive and irregular warpage. This warpage caused cracking, and sometimes breaking. The present invention contemplates making the warpage as uniform as possible, and reducing it to a point where it can be easily and permanently corrected.

High temperatures in the heat treatment result in warpage. By heating the plow share only as far above the critical range of high carbon layer 8 as necessary, increased warpage which would result from higher temperatures is avoided.

On cooling, the hard layer 8, in passing through its critical range, will shrink considerably, while the layer 9, never having been heated through its own critical range, will shrink but little and uniformly. If the layer 8 is soft, it can yield and give, thereby preventing the shrinkage from causing excessive warpage. If, however, the surface of the layer 8 is hard before the interior reaches the critical range, as it will be if quenched when substantially above the critical range, the interior in shrinking from the unyielding exterior will cause excessive warping and will set up severe stresses. The higher the temperature is above the critical range when the plow share is quenched, the greater will be the warpage. Hence, in carrying out the present invention, the plow share is quenched when the temperature is near or at the critical range of the layer 8, and preferably near the lower limit of the range. This will cause more nearly uniform cooling, and hence will greatly reduce warpage.

The plow share should shrink uniformly in cooling from the critical range. To shrink uniformly, the plow share must be cooled uniformly. In heating the plow share to high temperatures, the surface oxidizes very readily, and the scale of oxide, being a heat insulator, will, if not removed, prevent uniform cooling. Therefore, after the heat treatment, and just before the share is immersed in the quenching bath, the share is dropped or handled in some suitable way to quickly remove the scale of oxide. To prevent oxidation and hence the formation of a heat insulating scale, the plow share may be coated with a layer of relatively non-oxidizing material, such as a very thin copper plate, before the heat treatment. Oxidization may be prevented to a substantial degree by making the plow share of chromium steel, the chromium also serving to produce a harder steel. In this connection it is to be understood that the soft layer 9 need only be soft enough to provide sufficient toughness for preventing breaking of the share, and to wear more readily than the hard layer 8.

To correct the slight warpage that may have obtained in the process thus far described, the plow share is quickly removed from the quenching bath when its temperature has fallen to a point slightly above that at which molecular action ceases, and is placed in a suitable shaping or forming press. Preferably this temperature ranges between 100° C. to 160° C. If the plow share were removed from the bath at a substantially higher temperature, the layer 8 would temper or draw, thereby losing its hardness. It is deemed unnecessary herein to show the specific construction of the shaping or forming press, since the latter per se forms no part of the present invention. The forming press with the plow share therein may be allowed to cool in the atmosphere, but preferably is immersed in a washing bath, such as a water bath, before the temperature has fallen to the point at which molecular action ceases, and is left in the bath until the plow share has cooled to a final temperature, after which no further warping can occur. The slight molecular change which occurs after the plow share is placed in the press serves to set the crystalline structure and to remove the stress which results from correcting the warpage.

As a result, a steel plow share having a hard layer and a soft layer, and being substantially unwarped, is obtained. In use, the upper layer 8 is subjected to most of the wear, but being very hard and durable will wear slowly, and because of its union with the soft layer 9 will not break readily, due to the ductility of the latter. As the share wears away, the wear of the soft layer 9 precedes that of the hardened layer so that the latter always presents a substantially sharpened edge. The plow share is smooth, hard, durable and sharp. The method of making the plow share causes the layer 8 to have maximum hardness, and strength, causes the layer 9 to have maximum ductility and toughness, reduces warpage to a minimum, causes what warpage there is to be substantially uniform, and permanently corrects that warpage without setting up stresses and without cracking the plow share.

While the invention is particularly applicable to plow shares and renders same self-sharpening, it will be obvious that in its broad aspect it is applicable generally to soil-tilling members.

We claim for our invention:

1. A self-sharpening soil-tilling member comprising, in combination, a relatively high carbon hardened upper layer of steel having a relatively sharp cutting edge, and a ductile layer of steel underlying said first mentioned layer, the carbon content of the steel in said last mentioned layer being less than .25%.

2. A self-sharpening soil-tilling implement comprising, in combination, a hardened layer of steel containing at least .8% carbon and having a relatively sharp edge, and a ductile layer of steel containing less than .25% carbon backing said first mentioned layer and receding slightly from the edge of said first mentioned layer.

3. An unwarped self-sharpening plow share comprising, in combination, a relatively high carbon hardened upper layer of chromium steel having a fine crystalline structure and having a relatively sharp cutting edge, the carbon content of said layer being from .8% to 1%, a ductile low carbon unhardened layer of steel thicker than and underlying said first mentioned layer and receding slightly from said edge, said last mentioned layer having a carbon content of less than .25% and having a gunnel formed integral therewith, the line of demarcation between said layers being substantially straight, the outer surfaces of both layers being smooth and uninterrupted, and a thin plating of copper on the exterior of said layers.

4. An unwarped self-sharpening plow share comprising, in combination, a relatively high carbon hardened upper layer of steel having a fine crystalline structure and having a relatively sharp cutting edge, the carbon content of said layer being from .8% to 1%, a ductile low carbon unhardened layer of steel underlying said first mentioned layer and receding slightly from said edge, the carbon content of said last mentioned layer being less than .25%, the line of demarcation between said layers being substantially straight, the outer surfaces of both layers being smooth and uninterrupted, and a thin coating of non-oxidizing material on the exterior of said layers.

5. An unwarped self-sharpening plow share comprising, in combination, a hardened upper layer of eutectoid steel having a fine crystalline structure and having a relatively sharp cutting edge, and a ductile low carbon unhardened layer of steel underlying said first mentioned layer and receding slightly from the edge of said first mentioned layer, the carbon content of said last mentioned layer being less than .25%, the line of demarcation between said layers being substantially straight, the outer surfaces of both layers being smooth and uninterrupted.

6. An unwarped self-sharpening plow share comprising, in combination, a relatively high carbon hardened upper layer of chromium steel having a fine crystalline structure and having a relatively sharp cutting edge, and a ductile low carbon unhardened layer of steel underlying said first mentioned layer, the carbon content of said last mentioned layer being less than .25%, the outer surfaces of both layers being smooth and uninterrupted.

7. A self-sharpening soil-tilling member comprising, in combination, a hardened upper layer of eutectoid steel having a fine crystalline structure and having a relatively sharp cutting edge, and a ductile low carbon unhardened layer of steel underlying said first mentioned layer and receding slightly from the edge of said first mentioned layer, the outer surfaces of both layers being smooth and uninterrupted.

8. A self-sharpening soil-tilling member comprising, in combination, a relatively high carbon hardened upper layer of steel having a relatively sharp cutting edge, and a ductile layer of steel underlying said first mentioned layer, the carbon content of the steel in said last mentioned layer being less than .25%, said ductile layer being thicker than said hardened layer.

9. A self-sharpening soil-tilling member comprising, in combination, a relatively high carbon hardened upper layer of steel having a relatively sharp cutting edge, a ductile layer of steel underlying said first mentioned layer, the carbon content of the steel in said last mentioned layer being less than .25%, and a thin coating of non-oxidizing material on the exterior of said layers.

10. A self-sharpening soil-tilling member comprising, in combination, a relatively high carbon hardened upper layer of steel having a relatively sharp cutting edge, a ductile layer of steel underlying said first mentioned layer, the carbon content of the steel in said last mentioned layer being less than .25%, and a gunnel formed integral with said ductile layer.

In testimony whereof we have hereunto affixed our signatures.

GEORGE BENJAMIN SHERMAN.
ROBERT HENRY POTTS.